United States Patent [19]

Sanada et al.

[11] Patent Number: 5,440,437
[45] Date of Patent: Aug. 8, 1995

[54] MAGNETIC HEAD ARM HAVING THERMAL COMPENSATION MEMBER FOR CORRECTING TRACKING ERROR

[75] Inventors: Yotaro Sanada; Noriaki Ishimatsu; Makoto Watanabe, all of Tokyo; Seiji Yamashita, Ibaragi, all of Japan

[73] Assignee: NEC Corporation, Tokyo, Japan

[21] Appl. No.: 248,464

[22] Filed: May 24, 1994

Related U.S. Application Data

[63] Continuation of Ser. No. 765,748, Sep. 26, 1991, abandoned.

[30] Foreign Application Priority Data

Sep. 26, 1990 [JP] Japan .................. 2-255608

[51] Int. Cl.6 .......................... G11B 5/48; G11B 17/00
[52] U.S. Cl. ................................ 360/104; 360/97.02; 360/106; 360/109
[58] Field of Search ................. 360/77.02, 97.02, 104, 360/105, 97.03, 109, 106, 105

[56] References Cited

U.S. PATENT DOCUMENTS

| | | | |
|---|---|---|---|
| 4,691,258 | 9/1987 | Kobayashi et al. | 360/97 |
| 4,814,908 | 3/1989 | Schmitz | 360/109 |
| 4,860,135 | 8/1989 | Cain | 360/97.02 |
| 5,140,482 | 8/1992 | Kimura et al. | 360/104 |
| 5,189,578 | 2/1993 | Mori et al. | 360/106 |
| 5,303,105 | 4/1994 | Jorgenson | 360/106 |

*Primary Examiner*—Georgia Y. Epps
*Assistant Examiner*—Kim-Kwok Chu
*Attorney, Agent, or Firm*—Sughrue, Mion, Zinn, Macpeak & Seas

[57] ABSTRACT

A magnetic head for use in a magnetic disk drive. An arm included in the head is partly constituted by a member which is different in the coefficient of thermal expansion from the other portion of the arm. This is successful in readily correcting a tracking error ascribable to the thermal expansion of the arm despite the varying ambient temperature.

18 Claims, 4 Drawing Sheets

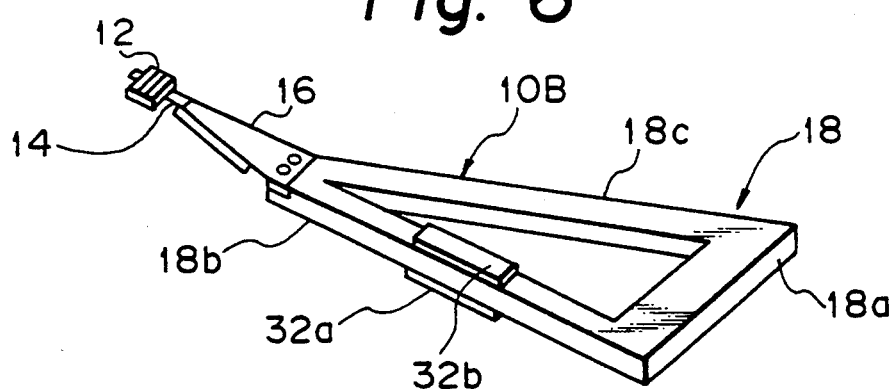
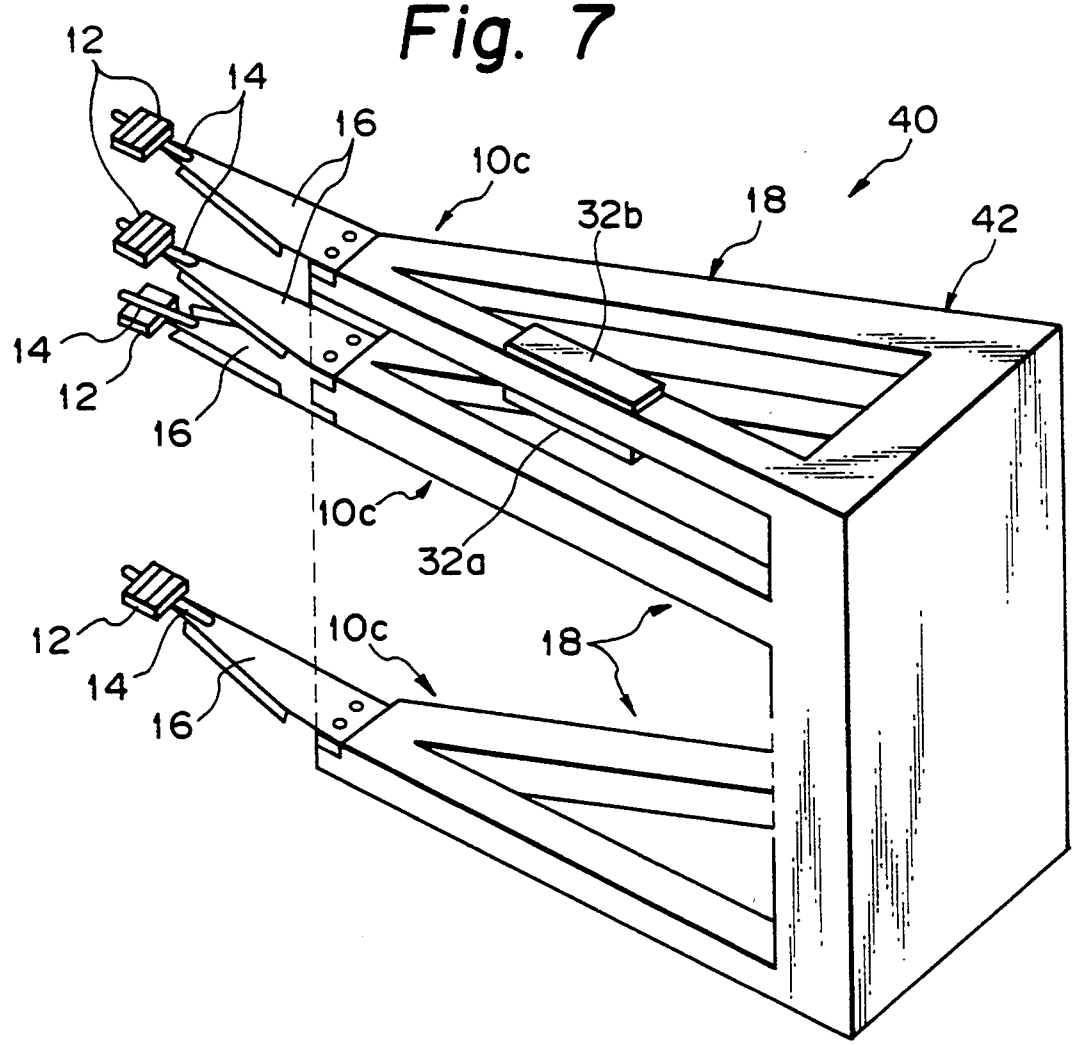

MAGNETIC HEAD ARM HAVING THERMAL COMPENSATION MEMBER FOR CORRECTING TRACKING ERROR

This is a continuation of application Ser. No. 07/765,748 filed Sep. 26, 1991, now abandoned.

BACKGROUND OF THE INVENTION

The present invention relates to a magnetic disk drive and, more particularly, to the structure of a magnetic head for use in a magnetic disk drive.

Magnetic disk drives for writing and reading data out of hard disks, stationary disks or similar magnetic disks are extensively used today. This kind of disk drive is usually loaded with a plurality of disks and a plurality of heads each being associated with respective one of the disks. Each of the heads has a slider including an electromagnetic transducer for writing and reading data, a gimbal spring retaining the slider, a pressing spring connected at one end thereof to the gimbal spring to press the slider against one side of the disk, and a generally right-angled triangular rigid arm to which the other end of the pressing spring is affixed. On the other hand, the disk drive has a positioning device for supporting the arms of the magnetic head arranged one above another, a plurality of disks mounted on a spindle, and a base plate supporting the positioning device and spindle. Generally, this type of disk drive brings the heads to a particular track position by closed loop control. Specifically, one of the heads is implemented as an exclusive servo head adapted for tracking control while one side of a particular disk associated with the servo head is provided with a servo surface. The servo head is movable together with the other heads, or data heads, and accesses the servo surface of the particular disk, thereby reading a positioning signal or servo signal thereoutof. The servo signal is used to position the heads at a desired track position. Hence, the servo head and the servo surface are prevented from being dislocated from each other, and so are done the data heads and the associated sides of the other disks.

However, the problem with the above-described disk drive is that the disk drive itself heats up as it is operated over a long period of time or due to changes in ambient conditions such as temperature elevation. Temperature elevation is also brought about by windage loss ascribable to the rotation of the disks. Such a temperature elevation causes various structural members of the disk drive, e.g., the heads, disks, positioning device, and base plate to thermally expand and thereby change the dimensions thereof. Although the changes in dimensions of this nature do not effect the relative position of the servo head and servo surface, they dislocate the data heads and the associated surfaces of disks to cause a so-called thermal off-track to occur. This prevents a high track density, mass magnetic disk drive from being implemented.

SUMMARY OF THE INVENTION

It is, therefore, an object of the present invention to provide a structure of a magnetic head for a disk drive capable of positioning magnetic heads thereof accurately even when temperature or similar ambient condition changes.

It is another object of the present invention to provide a generally improved magnetic head for a disk drive.

In accordance with the present invention, a structure of a magnetic head for a magnetic disk drive comprises a slider having an electromagnetic transducer for recording and reproducing data out of a magnetic disk, a gimbal spring retaining the slider, a pressing spring to one end of which the gimbal spring is affixed, an arm affixed to the other end of the pressing spring, and a correcting member constituting at least a single portion of the arm and having a different coefficient of thermal expansion from the arm.

Also, in accordance with the present invention, a magnetic head assembly for a magnetic disk drive comprises a head subassembly having a plurality of magnetic heads each being made up of a slider which records and reproduces data out of a magnetic disk, a gimbal spring retaining the slider, and a pressing spring to one end of which the gimbal spring is affixed, an arm subassembly having a plurality of arms formed integrally with each other in a comb-like configuration and each being affixed to the other end of respective one of the pressing springs of the head subassembly, and a correcting member constituting at least one portion of at least one of the plurality of arms of the arm subassembly and having a different coefficient of thermal expansion from the arm.

BRIEF DESCRIPTION OF THE DRAWINGS

The above and other objects, features and advantages of the present invention will become more apparent from the following detailed description taken with the accompanying drawings in which:

FIG. 6 is a perspective view showing an alternative embodiment of the present invention; and FIG. 7 is a perspective view of a magnetic head assembly having the heads and arms shown in FIG. 6 in a unitary configuration.

DESCRIPTION OF THE PREFERRED EMBODIMENTS

Figure 1:
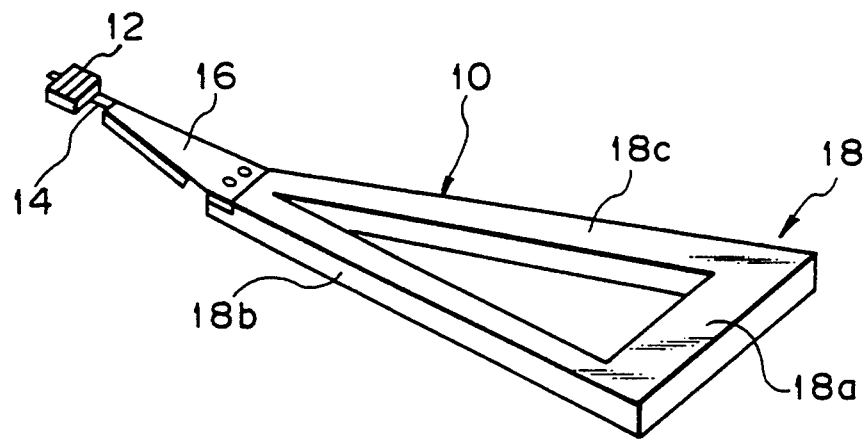
FIG. 1 is a perspective view of a magnetic head incorporated in a conventional disk drive.
Figure 2:
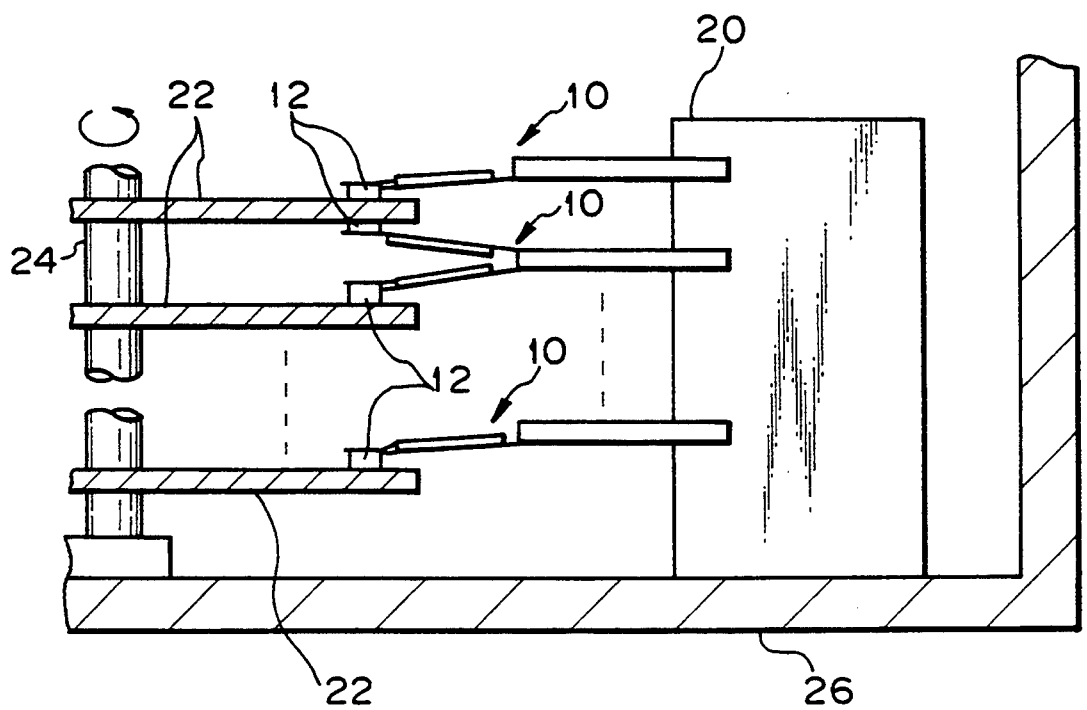
FIG. 2 is a section of a disk drive implemented with magnetic disks having the configuration shown in FIG. 1.

To better understand the present invention, a brief description will be made to a prior art magnetic head incorporated in a disk drive, shown in FIGS. 1 and 2. As shown in FIG. 1, the conventional magnetic head, generally, 10 has a slider 12 which has an electromagnetic transducer for recording and reproducing data out of a magnetic disk 22, FIG. 2. The slider 12 is retained by a gimbal spring 14 which is in turn affixed to one end of a pressing spring 16 which presses the slider 12 against one side of the disk 22 which is formed with tracks. The other end of the pressing spring 16 is affixed to a rigid arm 18. The arm 18 has a generally triangular configuration the inside of which is removed to reduce the weight. Specifically, the arm 18 has a base portion 18a and arms 18b and 18c which loin each other in a substantially isosceles triangular configuration. Usually, the arm 18 is made of aluminum alloy (e.g. 5052 (material name), magnesium ahoy or similar light weight substance. As shown in FIG. 2, a plurality of heads 10 each being essentially configured as shown in FIG. 1 are affixed to a positioning device 10 such that the arms 18 thereof lie one upon another. A plurality of magnetic disks 22 are mounted on a rotary shaft or spindle 24 one above another. The positioning device 20 and spindle 24 are mounted on a base plate 26. The sliders 12 of the heads 10 each faces one side or track surface of one of the disks 22 which stores data therein. The disks 22 are driven together by the spindle 24 while all the heads 10 are positioned by the positioning device 20 at a common track position. Generally referred to as a servo head, one of the heads 10 exclusively serves to position all of the heads 10 at a particular track position. The other heads 10 are called data heads, as distinguished from the servo head. The surface of a particular magnetic disk 22 associated with the servo head is formed with a servo surface, so that the servo head may serve the tracking function by reading a position signal or servo signal written in the servo surface. In this configuration, the servo head 10 and the servo surface of the particular disk 22 are free from positions deviations, and so are the data heads 10 movable together with the servo head 10 and the surfaces of the other disks 22 which are accessed by the data heads 10.

However, the problem with the above-described disk drive is that the disk drive itself heats up as it is operated over a long period of time or due to changes in ambient conditions such as temperature elevation, as stated earlier. Temperature elevation is also brought about by windage loss ascribable to the rotation of the disks 22. Such a temperature elevation causes various structural members of the disk drive, e.g., the heads 10, disks 22, positioning device 20 and base plate 26 to thermally expand and thereby change the dimensions thereof. Although the changes in dimensions of this nature do not effect the relative position of the servo head 10 and servo surface, they dislocate the data heads 10 and the associated surfaces of disks 22 to cause so-called thermal off-track to occur. This prevents a high track density, mass magnetic disk drive from being implemented.

Preferred embodiments of the magnetic head in accordance with the present invention will be described in detail hereinafter. In the figures, the same or similar components and structural elements are designated by like reference numerals, and redundant description will be avoided for simplicity.

Figure 3:
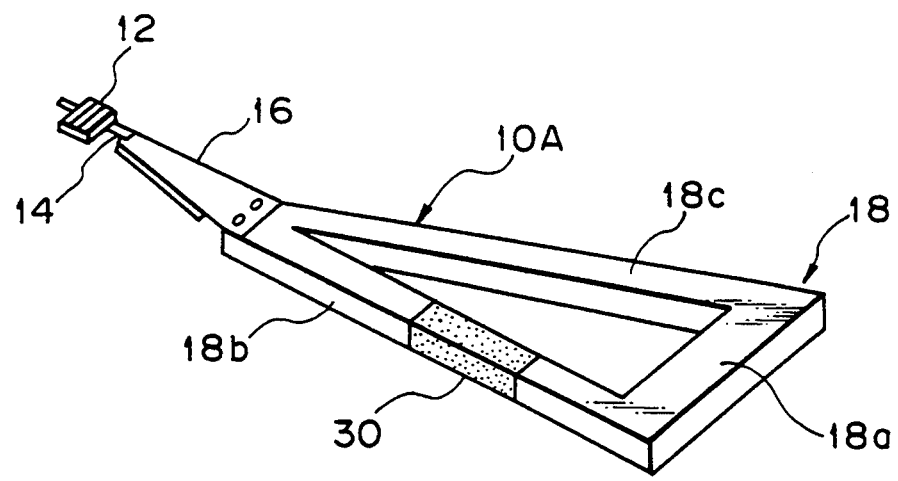
FIG. 3 is a perspective view of a magnetic head embodying the present invention.

Referring to FIG. 3, a magnetic head embodying the present invention is shown and generally designated by the reference numeral 10A. As shown, the head 10A, like the conventional head 10, has a slider 12, a gimbal spring 14, a pressing spring 16, and a generally right-angled triangular arm 18. In the illustrative embodiment, one of arm portions 18b and 18c included in the arm 18, arm 18b in the figure, is partly constituted by a correcting member 30. The correcting member 30 is made of a material whose coefficient of thermal expansion is different from that of the arm 18, e.g., stainless steel having a smaller coefficient of thermal expansion than aluminum alloy. The correcting member 30 and arm 18 are rigidly connected together by brazing, crimping or any other suitable technology.

Figure 4:
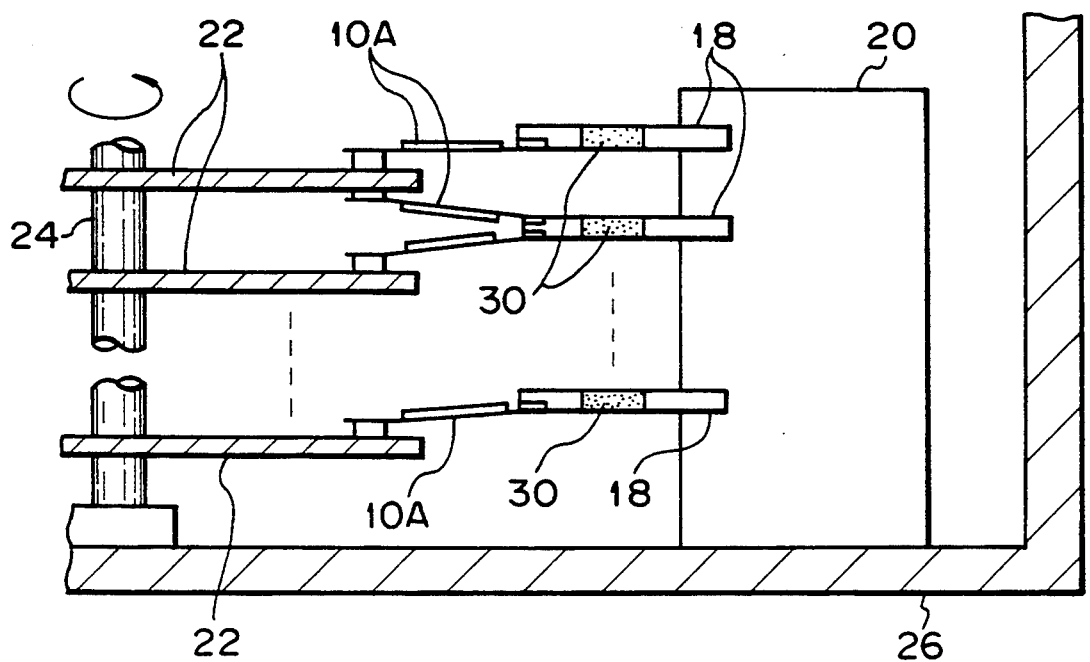
FIG. 4 is a section showing a disk drive implemened with the illustrative embodiment.

FIG. 4 shows a disk drive using the magnetic head 10A having the above unique configuration. As shown, the disk drive has a plurality of magnetic heads 10A, disks 22, positioning device 20, and base plate 26 which are arranged in essentially the same manner as in the conventional disk drive, FIG. 2. Specifically, the disks 22 are driven together by the spindle 24 while the heads 10A are brought to a particular track position by the positioning device 20.

Figure 5:
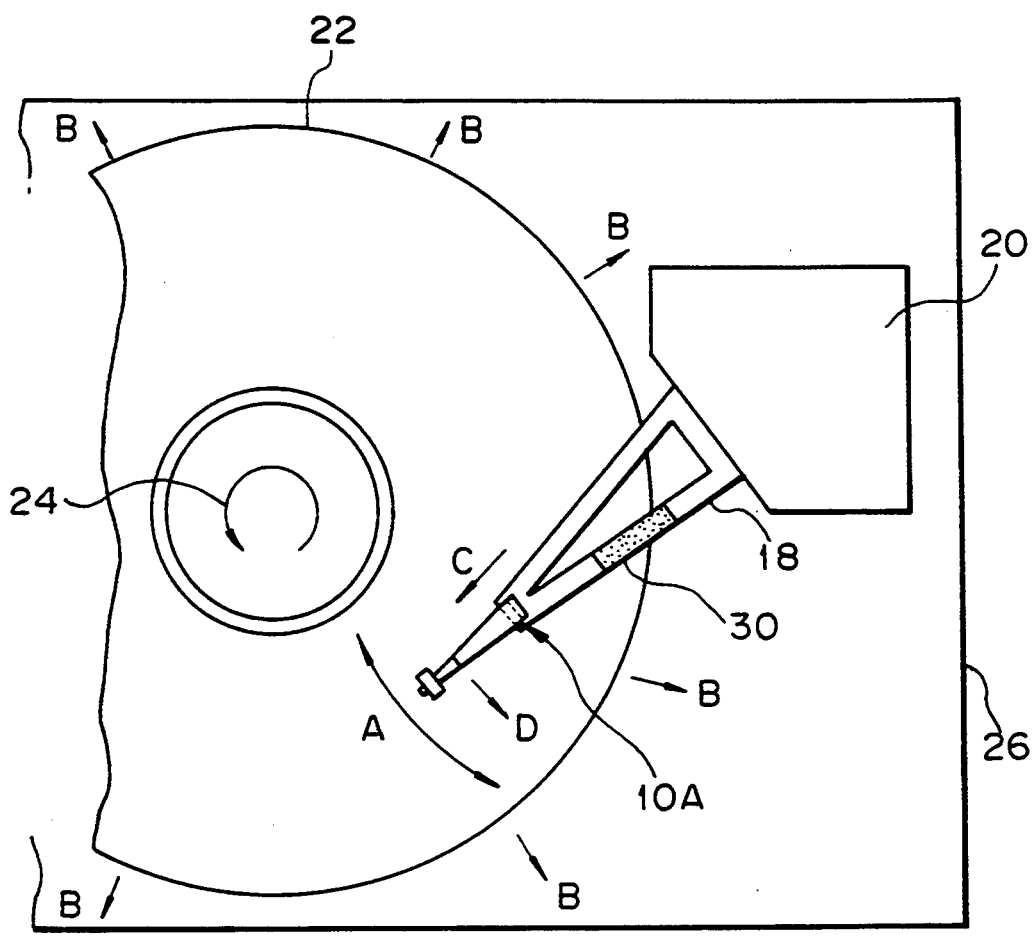
FIG. 5 is a view demonstrating how the embodiment corrects a thermal off-track.

Referring to FIG. 5, how the illustrative embodiment corrects a thermal off-track due to the heads 10A will be described. Here, the positioning device 20 positions the heads 10A by rotation, i.e., the heads 10A are movable in a reciprocating motion in a direction indicated by a double-headed arrow A. Assume that the ambient temperature and, therefore, the temperature of the disk drive is elevated to expand the various members constituting the disk drive (e.g. heads 10A and disks 22). Then, the tracks formed in the disks 22 are shifted in the radial direction, i.e., in the direction B while the heads 10A are stretched in a direction indicated by an arrow C. Since the resulting deviation of the heads 10A is substantially tangential in direction to the tracks of the disks 22, the deviation of the disks 22 in the direction B is predominant. The heads 10A of the embodiment each has the correcting member 30 in the arm portion 18b of the arm 18, as stated earlier. Since the correcting member 30 has a smaller coefficient thermal expansion than the associated arm portion 18b, the arm 18 is caused to shift in a direction indicated by an arrow D as the ambient temperature rises. More specifically, the sliders 12 are dislocated in the same direction as the tracks of the disks 22. This is successful in correcting the dislocation of the tracks of the disks 22.

Referring to FIG. 6, an alternative embodiment of the present invention is shown. As shown, a magnetic head 10B has a pair of correcting members in the form of thin flat pieces 32a and 32b in place of the correcting member 30, FIG. 3. The correcting members 32a and 32b are adhered to opposite sides of the arm portion 18b of the arm 18 by adhesive such as epoxy-based adhesive (code No. JA7437). The correcting members 32a and 32b may be made of stainless steel or ceramic such as $Al_2O_3$ (alumina). Such correcting members 32a and 32b also have a coefficient of thermal friction smaller than that of the arm 18, restricting the extension of the arm portion 18b due to thermal expansion. Hence, this embodiment is equivalent with the previous embodiment regarding the advantage over the prior art. Despite the correcting members or thin pieces 32a and 32b, the moment of inertia of each head 10B does not increase by more than 1 percent and, therefore, does not effect the tracking speed at all.

A plurality of magnetic heads 10B each having the configuration shown in FIG. 6 may be assembled as shown in FIG. 7 specifically. In FIG. 7, the disk drive, generally 40, is made up of an arm subassembly 42 having a plurality of arms 18 arranged in a comb-like configuration, and a plurality of heads 10C each having a slider 12, a gimbal spring 14, and a pressing spring 16. The correcting members 32a and 32b are adhered to both sides of at least one of the arms 18 at one or more positions of the latter.

The number of correcting members 30 or 32a and 32b described above as well as the dimensions, substance and position thereof may be adequately selected on the basis of experimental results regarding the expansion/contraction to temperature characteristic of each structural member. Generally, the thermal expansion of a magnetic disk drive depends on the heat distribution in the disk drive. Hence, not all of the heads should be implemented by any of the specific configurations of the present invention, i.e., an adequate configuration matching a particular dislocation or deviation should be selected.

In summary, it will be seen that the present invention provides a magnetic head in which an arm is partly constituted by a member different in the coefficient of thermal expansion from the other part, so that a tracking error ascribable to the thermal expansion of the arm is readily corrected despite the varying ambient temperature. Such a magnetic head implements a high track density, mass disk drive.

Various modifications will become possible for those skilled in the art after receiving the teachings of the present disclosure without departing from the scope thereof.

What is claimed is:

1. A structure of a magnetic head for a magnetic disk drive, comprising:
    a slider comprising an electromagnetic transducer for recording and reproducing data out of a magnetic disk;
    a gimbal spring retaining said slider;
    a pressing spring to one end of which said gimbal spring is affixed;
    an arm affixed to the other end of said pressing spring; and
    a correcting member constituting at least a single portion of said arm and having a different coefficient of thermal expansion from said arm,
    wherein said arm comprises a first arm, a second arm and a base arm, which arms are combined to form a triangular shape,
    wherein said correcting member forms a part of either said first arm or said second arm, and
    wherein said correcting member, said first arm and said second arm being continuously maintained at ambient temperature.

2. A structure as claimed in claim 1, wherein the coefficient of thermal expansion of said correcting member is smaller than the coefficient of thermal expansion of said arm.

3. A structure as claimed in claim 1, wherein said correcting member is connected to said arm by brazing.

4. A structure as claimed in claim 1, wherein said correcting member is connected to said arm by crimping.

5. A structure as claimed in claim 1, wherein said correcting member has a crossectional area substantially equal to the associated one of said first arm or said second arm.

6. A magnetic head assembly for a magnetic disk drive, comprising:
    a head subassembly comprising a plurality of magnetic heads each being made up of a slider which records and reproduces data out of a magnetic disk, a gimbal spring retaining said slider, and a pressing spring to one end of which said gimbal spring is affixed;
    an arm subassembly comprising a plurality of arms formed integrally with each other in a comb-line configuration and each being affixed to the other end of respective one of said pressing springs of said head subassembly; and
    a correcting member constituting at least one portion of at least one of said plurality of arms of said arm subassembly and having a different coefficient of thermal expansion from said arm,
    wherein said at least one of said arms comprises a first arm, a second arm and a base arm, which said first arm, said second arm and said base arm are combined to form a triangular shape,
    wherein said correcting member forms a part of either said first arm or said second arm, and
    wherein said correcting member, said first arm and said second arm being continuously maintained at ambient temperature.

7. An assembly as claimed in claim 6, wherein said correcting member is adhered to said arm by adhesive.

8. An assembly as claimed in claim 6, wherein said correcting member has a smaller coefficient of thermal friction than said arm.

9. An assembly as claimed in claim 6, wherein said correcting member has a crossectional area substantially equal to the associated one of said first arm or said second arm.

10. A structure of a magnetic head for a magnetic disk drive, comprising:
    a slider comprising an electromagnetic transducer for recording and reproducing data out of a magnetic disk;
    a gimbal spring retaining said slider;
    a pressing spring to one end of which said gimbal spring is affixed;
    an arm affixed to the other end of said pressing spring; and
    a correcting member constituting at least a single portion of said arm and having a different coefficient of thermal expansion from said arm,
    wherein said arm comprises a first arm, a second arm and a base arm, which arms are combined to form a triangular shape,
    wherein said correcting member forms a part of either said first arm or said second arm, and
    wherein said correcting member, said first arm and said second arm are mechanical elements.

11. A structure as claimed in claim 10, wherein said correcting member has a crossectional area substantially equal to the associated one of said first arm or said second arm.

12. A structure as claimed in claim 10, wherein the coefficient of thermal expansion of said correcting member is smaller than the coefficient of thermal expansion of said arm.

13. A structure as claimed in claim 10, wherein said correcting member is connected to said arm by brazing.

14. A structure as claimed in claim 10, wherein said correcting member is connected to said arm by crimping.

15. A magnetic head assembly for a magnetic disk drive, comprising:
    a head subassembly comprising a plurality of magnetic heads each being made up of a slider which records and reproduces data out of a magnetic disk, a gimbal spring retaining said slider, and a pressing spring to one end of which said gimbal spring is affixed;
    an arm subassembly comprising a plurality of arms formed integrally with each other in a comb-line configuration and each being affixed to the other end of a respective one of said pressing springs of said head subassembly; and
    a correcting member constituting at least one portion of at least one of said plurality of arms of said arm subassembly and having a different coefficient of thermal expansion from said arm,
    wherein said at least one of said arms comprises a first arm, a second arm and a base arm, which said first arm, said second arm and said base arm being combined to form a triangular shape, wherein said correcting member forms a part of either said first arm or said second arm, and wherein said correcting member, said first arm and said second arm are mechanical elements.

16. An assembly as claimed in claim 15, wherein said correcting member has a smaller coefficient of thermal friction than said arm.

17. An assembly as claimed in claim 15, wherein said correcting member is adhered to said arm by adhesive.

18. An assembly as claimed in claim 15, wherein said correcting member has a crossectional area substantially equal to the associated one of said first arm or said second arm.

* * * * *

UNITED STATES PATENT AND TRADEMARK OFFICE
CERTIFICATE OF CORRECTION

PATENT NO. : 5,440,437
DATED : August 8, 1995
INVENTOR(S) : Yotaro SANADA et al.

It is certified that error appears in the above-indentified patent and that said Letters Patent is hereby corrected as shown below:

Column 2, line 65, delete "loin", insert --join--.

Signed and Sealed this

Twenty-first Day of November, 1995

Attest:

BRUCE LEHMAN

Attesting Officer

Commissioner of Patents and Trademarks